United States Patent [19]

Morgan et al.

[11] Patent Number: 4,736,883

[45] Date of Patent: Apr. 12, 1988

[54] METHOD FOR DIFFUSION BONDING OF LIQUID PHASE SINTERED MATERIALS

[75] Inventors: Ricky D. Morgan, Ulster; Vito P. Sylvester, Athens, both of Pa.

[73] Assignee: GTE Products Corporation, Stamford, Conn.

[21] Appl. No.: 18,669

[22] Filed: Feb. 25, 1987

[51] Int. Cl.$^4$ .................. B23K 20/16; B23K 27/00
[52] U.S. Cl. .................... 228/194; 228/231; 228/263.19; 419/46; 419/54
[58] Field of Search ............ 228/194, 231, 263.19; 419/47, 54

[56] References Cited

U.S. PATENT DOCUMENTS

| | | | |
|---|---|---|---|
| 3,259,971 | 7/1966 | Gagola et al. | 228/194 |
| 3,411,902 | 11/1968 | Krock et al. | 419/54 |
| 3,444,613 | 5/1969 | Foerster | 228/231 |
| 3,979,234 | 9/1976 | Northcutt, Jr. et al. | 419/54 |
| 4,289,833 | 9/1981 | Hachisuka | 419/10 |
| 4,593,776 | 6/1986 | Salesky et al. | 76/108 A |
| 4,605,599 | 8/1986 | Penrice et al. | 419/54 |
| 4,613,369 | 9/1986 | Koehler | 419/8 |

FOREIGN PATENT DOCUMENTS

| | | | |
|---|---|---|---|
| 1184606 | 5/1961 | Fed. Rep. of Germany | 228/231 |
| 17438 | of 1909 | United Kingdom | 419/46 |
| 45701 | 1/1957 | United Kingdom | 419/46 |

*Primary Examiner*—M. Jordan
*Assistant Examiner*—Samuel M. Heinrich
*Attorney, Agent, or Firm*—Donald R. Castle; L. Rita Quatrini

[57] ABSTRACT

A method is disclosed for bonding liquid phase sintered metal powder parts of a tungsten alloy containing nickel. The method involves placing a sheet of copper based material between the parts at their adjoining surfaces to join the parts with the sheet covering essentially the entire area of the surfaces, heating the resulting assembly at a temperature sufficient to melt the copper based material without melting the parts, cooling the resulting heated assembly to room temperature, reheating the assembly at a temperature which is high enough to cause diffusion of the copper based material and the matrix alloying elements into one another without melting the parts, and cooling the resulting twice heated assembly.

3 Claims, 3 Drawing Sheets

METHOD FOR DIFFUSION BONDING OF LIQUID PHASE SINTERED MATERIALS

This invention relates to a method for diffusion bonding of liquid phase sintered material by a two step heating of the parts to be bonded with a sheet of copper based material placed between the parts, wherein the copper melts and the matrix alloying elements of the part diffuse into each other and form the bond.

BACKGROUND OF THE INVENTION

Powder metallurgy processes involve use of a metal powder as a raw material. The metal powder can be pure metal or several powders of various metals can be blended together to form alloys. The metal powder can be formed to near net shape by placing it into a mold (usually made of types of rubbers) of desired size and shape. The mold is first placed into a steel container similar in size and shape to the mold in order to retain the mold's shape when filled with powder. The mold is then sealed by either mechanical means or liquid rubber. The assembly is then isostatically pressed (pressure from all directions) using an oil or water medium with pressures from 15,000 to 60,000 psi. The part is compacted and is in the as pressed or "green" state. It can be handled but will crack and chip if dropped and jarred. Therefore it is heated in a furnace at a temperature below its melting point to densify and strengthen it. This process is called sintering and involves a coalescing of powder particles into a metallic structure. There are basically two types of sintering. Solid state sintering is associated mainly with pure metals and some alloys. Liquid phase sintering is tied to only alloys and it involves the melting of the metal powders that are the alloying elements. The alloy is heated above the melting point of the alloying elements but below the melting point of the main element of the alloy. This liquid phase of alloying elements surrounds the base material and diffusion and bonding occur between the liquid phase and the base material. Thus, this type of material approaches near 100% theoretical density while solid state sintering normally produces a material with a maximum of 97% of the theoretical density.

It is sometimes necessary due to size limitations of the equipment in forming near net shape liquid phase sintered parts, to bind smaller size liquid phase sintered together to make the larger part.

The present invention invention provides a method for joining such parts by a diffusion bonding technique.

SUMMARY OF THE INVENTION

In accordance with one aspect of this invention there is provided a method for bonding liquid phase sintered metal powder parts of a tungsten alloy containing nickel. The method involves placing a sheet of copper based material between the parts at their adjoining surfaces to join the parts with the sheet covering essentially the entire area of the surfaces, heating the resulting assembly at a temperature sufficient to melt the copper based material without melting the parts, cooling the resulting heated assembly to room temperature, reheating the assembly at a temperature which is high enough to cause diffusion of the copper based material and the matrix alloying elements into one another without melting the parts, and cooling the resulting twice heated assembly.

DETAILED DESCRIPTION OF THE INVENTION

Figure 1:
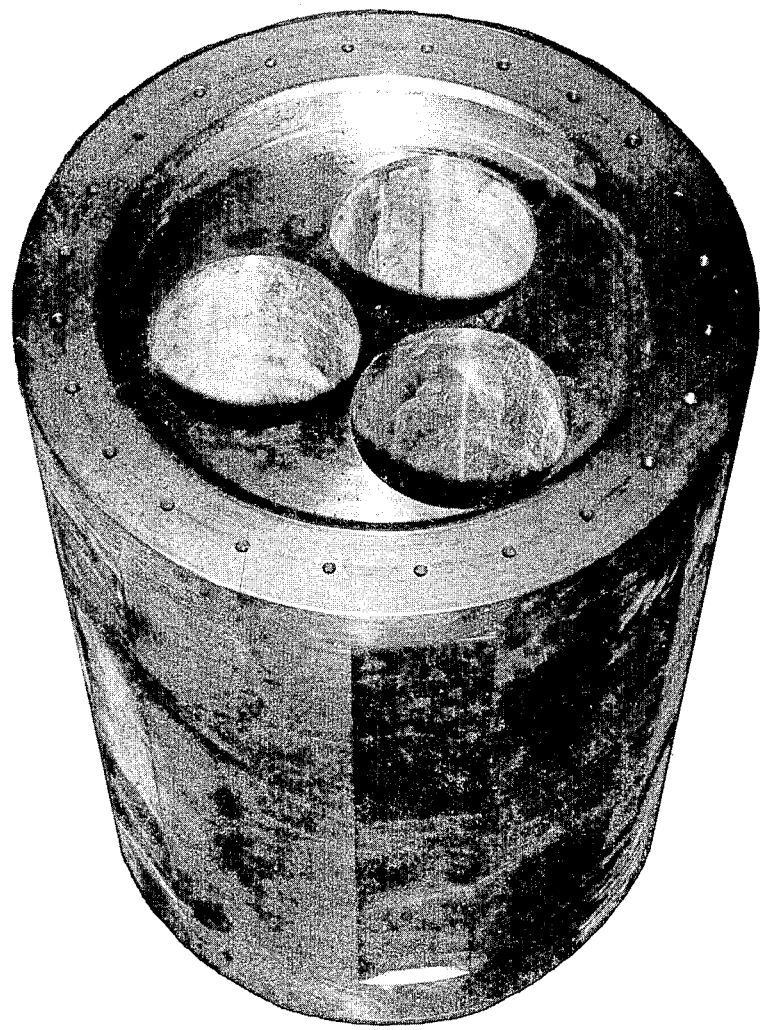
FIG. 1 is a photograph of a part made by bonding several parts together by the diffusion bonding method of the present invention.

For a better understanding of the present invention, together with other and further objects, advantages and capabilities thereof, reference is made to the following disclosure and appended claims in connection with the above described Figures and description of some of the aspects of the invention.

By the method of this invention, liquid phase sintered powder metal parts are bonded together by diffusion bonding mechanism. That is, the parts are joined together at their adjoining surfaces by a sheet of copper based material and the resulting assembly is subjected to two heat treatments. As a result the copper melts and the copper and matrix alloying elements of the parts diffuse into each other to bond the two interfaces.

The parts to be bonded together by the method of this invention are powder metallurgically produced metal alloy parts. The alloy can be any liquid phase sintered tungsten alloy powder containing nickel. The following are given as examples of some alloys that are especially suited to the method of the present invention. It is to be understood that the following are merely examples and that the invention is not limited to these alloys. One type of alloy is a tungsten alloy which contains either nickel and iron or nickel and copper. One such alloy is WN205F ™ made by The Chemical and Metallurgical Division of GTE Products Corporation. This alloy consists essentially of about 92% tungsten, about 4% nickel, and about 4% by weight iron. Other alloys that are suitable for the practice of this invention are GTE's WN735F and WN737F which have weight compositions of about 1.15% Ni, about 1.15% Fe and the balance W; and about 1.6% Ni, about 0.69% Fe, and the balance W respectively. In addition to the major constituents making up the alloy, such as nickel with iron and/or copper, there can be trace amounts of other metals that make up to about 1% by weight of the alloy.

The individual parts to be bonded do not have to be made of the exact same alloy. However, it is necessary that the alloying elements are sufficiently compatible so that they diffuse properly under the process conditions and form the bond.

The method of this invention is not limited to any particular size or shape. However one example of a type of part that is bonded by the method of this invention is parts which are cylindrical in shape.

A sheet of copper based material is placed between two parts which covers their entire adjoining surfaces. For example in a cylindrical part, the copper based material is placed between the parts along their adjoining circular surfaces. The parts can have male/female counter bores but it is preferred that the flatness across the diameter of adjoining surfaces be held within about 0.002" of each other and that these surfaces be sufficiently clean to enhance the bond. The surface finish must be smooth enough to enhance the bonding. If the surfaces are too rough, a good bond will not be formed because the surfaces are will not be sufficiently flat across the entire surface. On the other hand, if the surfaces are too smooth, the matrix alloying elements will not diffuse properly and a good bond will not be formed. It is preferred that the parts have a 125 RMS finish. This results in a good bond.

The copper based material serves as the "transportation" or flux for diffusion between the two adjoining surfaces, or interfaces of the parts. The thickness of the copper based sheet is typically about 0.006".

The copper based material can be copper metal or a copper alloy.

Prior to the heating, it is preferred to put a paste of alumina on the outside edge of one or both of the parts. This prevents the copper from running out of the bond during the heating.

The assembly of parts and copper sheet is heated at a temperature sufficient to melt the copper based material without melting the parts. The temperature and time depend on the alloy or alloys of which the parts are made.

The resulting heated assembly is then cooled slowly, typically in the furnace, to room temperature.

The assembly is then reheated at a temperature which is high enough to cause diffusion of the copper based material and the matrix alloying metals into one another without melting the parts or causing liquid phase sintering of the matrix alloying elements. For a tungsten alloy containing nickel and iron the typical temperature is about 1400° C. At these temperatures the times are generally about 3 hours.

The resulting twice heated assembly is then slowly cooled in the furnace to room temperature.

Two heating steps are necessary in the practice of this invention because if only one heating step is carried out, the copper based material would diffuse out of the bond.

Figure 2:
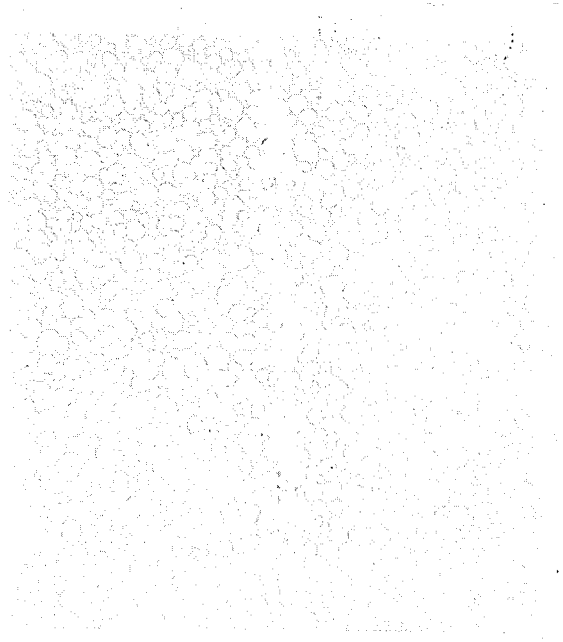
FIG. 2 is a photomicrograph at 100X magnification showing the microstructure of a bond between two parts and the copper based material interface after the first heating. The bondline is visible.

FIG. 2 is a photomicrograph at 100X mangification showing the microstructure of a bond between two parts and the copper based material interface after the first heating. The bondline can be seen.

Figure 3:
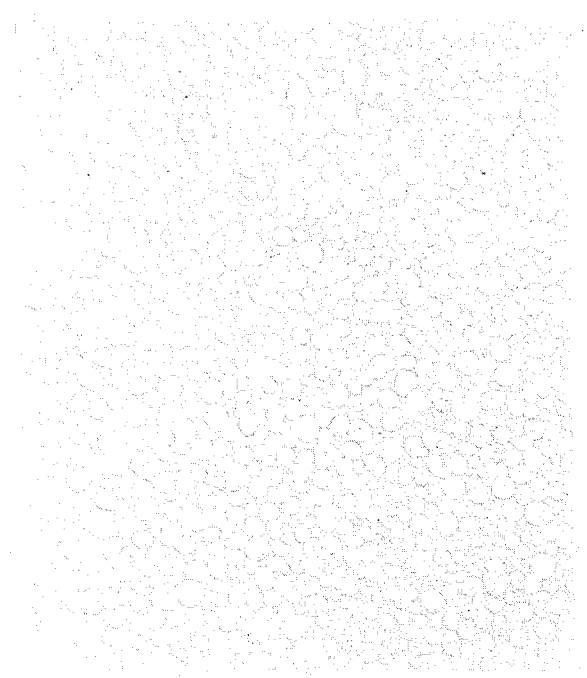
FIG. 3 is a photomicrograph at 100X magnification showing the microstructure of a bond between two parts after the second heating. The bonding is not visible.

FIG. 3 is a photomicrograph at 100X magnification showing the microstructure of a bond between two parts after the second heating. The bondline is not visible.

FIGS. 2 and 3 show that the two heating steps are necessary to accomplish the bonding without detection of the interface bondline.

The bonding method of this invention does not involve liquid phase sintering of the alloying elements of the base material of the parts. This is an important feature of the present invention because when sintering occurs in the parts, there is distortion of the part. This does not occur in the practice of this invention. Therefore, the parts that are bonded maintain their shape. As a result of this, there is virtually no restriction on the size of parts that can be bonded. For example, in cylindrical parts, the greater the height to diameter ratio, the greater the chance of slumping if liquid phase sintering occurs. By the present invention, since parts can be bonded without any liquid phase sintering occuring in the parts, this distortion is avoided.

FIG. 1 is a photograph of a part made by bonding several parts together by the method of this invention. No bond appears visible.

The bonds have high strength, are fully complete across the entire area of the bond, and are undetectable visually, and microstructurally.

By the method of this invention, two parts can be bonded together, and then the resulting bonded parts can be bonded to still another part, and so on, so that parts of virtually any size can be made subject only to the limitations of the nature of equipment available.

To more fully illustrate this invention, the following non-limiting example is presented.

EXAMPLE

A sheet of essentially oxygen-free high conductivity copper (OFHC) of about 0.006" thick is placed between the faces of three cylindrically shaped parts of WN-205F tungsten alloy parts to subsequently bond the parts together making two bonds. The faces have 125 RMS finishes and male/female counterbores with flatness across the diameter held to about 002". The sizes of the parts are 7.000", 8.000", and 12" in height and about 20.5" in diameter. Subscale parts are also made for test purposes. An alumina paste is placed on the outside edge of the parts near the bondline interface between the parts to prevent copper from running out of the bond. The resulting assembly is heated to a temperature of about 1200° C. for about 12 hours. As a result of this, the copper melts. The assembly is then cooled to room temperature. The assembly is then reheated to about 1400° C. for about 3 hours to allow diffusion of the copper and matrix alloying materials to occur between the adjoining surfaces of the parts. The parts are checked microscopically on subscales, that is, on smaller parts scaled down. After the second heating the bondline is virtually invisible microscopically. In the heat treatments, only the copper is melted and none of the alloying elements of the parts are melted. The subscale samples of these parts are tensile tested with the bonds placed in the center of the gauge length of the tensile samples. In all cases the break during testing occurs away from the site of the bond and strengths of bonded parts are similar to like unbonded parts. Ultrasonic standards are made after the first heat treatment and after the second heat treatment for bad and good bonds. These are used to check the final bonded part. Both bonds have similar readings as the acceptable standard. Therefore the integrity of the bond is proven and the bonding method is considered a success.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for bonding liquid phase sintered metal powder parts of a tungsten alloy containing nickel, said method comprising:
 (a) placing a sheet of copper based material between said parts at their adjoining surfaces to join said parts with said sheet covering essentially the entire area of said surfaces;
 (b) heating the resulting assembly of said parts and said sheet at a temperature sufficiently to melt said copper based material without melting said parts;

(c) cooling the resulting heated assembly to room temperature;

(d) reheating said assembly at a temperature which is high enough to cause diffusion of said copper based material and the matrix alloying metals into one another without melting said parts;

(e) cooling the resulting twice heated assembly to room temperature.

2. A method of claim 1 wherein said tungsten alloy contains additional metals selected from the group consisting of iron, copper, and combinations thereof.

3. A method of claim 1 wherein said copper based material is selected from the group consisting of copper metal and copper alloys.

* * * * *